United States Patent [19]

Edakubo

[11] Patent Number: 4,714,970
[45] Date of Patent: Dec. 22, 1987

[54] REPRODUCING APPARATUS HAVING RECORDING SPEED DISCRIMINATING SYSTEM

[75] Inventor: Hiroo Edakubo, Tokyo, Japan

[73] Assignee: Canon Kabushiki Kaisha, Tokyo, Japan

[21] Appl. No.: 855,172

[22] Filed: Apr. 22, 1986

[30] Foreign Application Priority Data

Apr. 25, 1985 [JP] Japan .................................. 60-087613

[51] Int. Cl.[4] ...................... G11B 15/44; H04N 5/782
[52] U.S. Cl. ..................................................... 360/73
[58] Field of Search ........................................ 360/73

[56] References Cited

U.S. PATENT DOCUMENTS

| 4,297,733 | 10/1981 | Sanderson | 360/77 |
| 4,550,345 | 10/1985 | Terada et al. | 360/73 |
| 4,594,618 | 6/1986 | Kozuki et al. | 360/73 |
| 4,607,298 | 8/1986 | Yamashita | 360/73 |
| 4,618,899 | 10/1986 | Doutsubo | 360/73 |

Primary Examiner—Robert L. Richardson
Attorney, Agent, or Firm—Toren, McGeady & Associates

[57] ABSTRACT

An apparatus for reproducing signals recorded on a recording medium with a plurality of rotary heads is arranged to discriminate a medium moving speed employed for recording by comparing signals simultaneously reproduced by these rotary heads.

21 Claims, 4 Drawing Figures

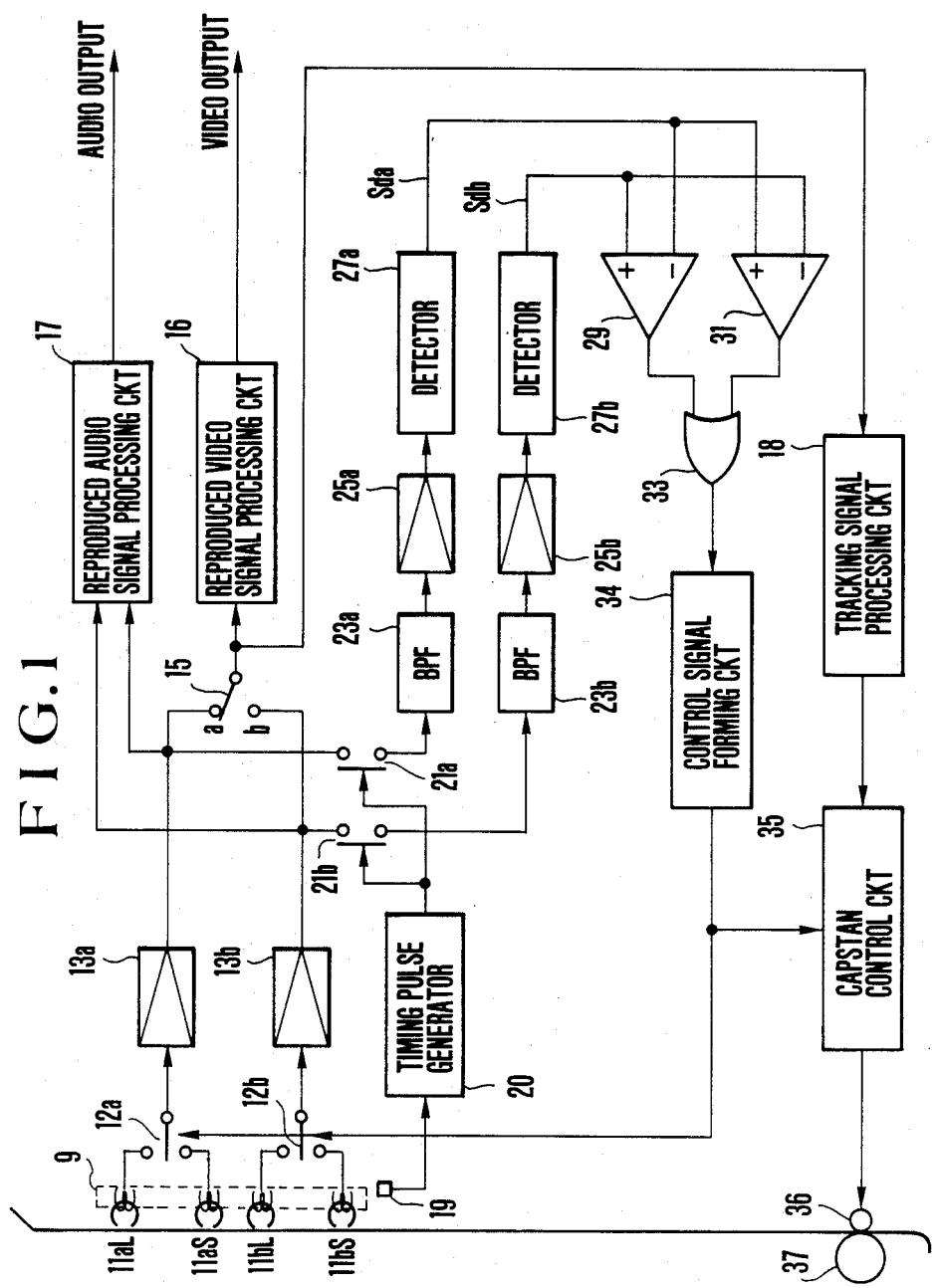
F I G. 1

REPRODUCING APPARATUS HAVING RECORDING SPEED DISCRIMINATING SYSTEM

BACKGROUND OF THE INVENTION

1. Field of the Invention

This invention relates to a reproducing apparatus having a recording speed discriminating system and, more particularly, to an apparatus arranged to reproduce signals recorded on a recording medium with a plurality of rotary heads.

2. Description of the Prior Art

Among the conventional video tape recorders (hereinafter will be called VTR's), there have been the kind selectively using two or more different tape moving speeds in recording or reproducing signals. Some of them, such as the VTR's called VHS type, are arranged to be capable of recording over different periods of two and six hours. In the VTR of this kind, the width of a magnetization track, i.e. track width, obtained according to the recording format of a six-hour mode is only ⅓ of the track width obtained by the format of a two-hour mode. Meanwhile, with the same head and tape system used, the S/N ratio of a reproduced picture is determined by a sliding noise, the noise of the apparatus, the track width, etc. Therefore, a wider track width is preferable in terms of the S/N ratio. Hence, reproduced picture quality obtainable by the six-hour mode is inferior to the quality obtainable by the two-hour mode. In view of this, some of the conventional VTR's are arranged to record or reproduce signals in the two-hour mode in cases where a high reproduced picture quality is required and in the six-hour mode when no particularly high quality is required.

Change-over between the two- and six-hour modes is effected by changing the tape moving speed as mentioned above. The tape speed is arranged to be manually changed in recording according to the recording purpose of the operator or to be automatically changed by utilizing a reproduced control signal. The control signal is a signal of 30 Hz which is obtained by frequency dividing a vertical synchronizing signal contained in a video signal and is longitudinally recorded along a recording tape. In recording a signal f of a given frequency on a tape, the recording wavelength [ on the tape depends on the tape speed Vt. This relation can be expressed as Vt=f. Accordingly, with the control signal of 30 Hz recorded, the frequency of the signal reproduced at the same tape speed as a speed employed in recording is also 30 Hz. In case that signal recorded at a tape speed of the two-hour mode is reproduced at a tape speed of the six-hour mode which is ⅓ of the recording tape speed, the frequency of the reproduced signal is 10 Hz. Conversely, when the signal recorded in the six-hour mode is reproduced in the two-hour mode, the frequency of the signal reproduced is 90 Hz. Therefore, the tape speed employed in recording can be found by measuring the period of the reproduced control signal. This is the principle of the tape speed discriminating method of using the control signal.

The principal purpose of the control signal is to control the rotary video head or a tape driving system in such a way as to have the head accurately trace the recording tracks during a reproducing operation. The tracking control method of using the control signal has been well known. However, the tracking control system using the control signal is incapable of giving information on the recording track position obtained at each specific moment although it gives averaged information on the track position.

VTR's have recently been trending toward recording with increased recording density. As a result of this trend, there has been proposed a method of performing tracking control without arranging any separate area for recording the control signal. The VTR adopting this method is, however, incapable of discriminating the tape speed by the above-stated conventional method in cases where a plurality of different tape speeds are selectable for recording and reproduction. Therefore, there have arisen the need for a new tape speed discriminating method for solving these problems.

SUMMARY OF THE INVENTION

It is an object of this invention to provide a reproduciig apparatus having a novel recording speed discriminating system which meets the above-stated needs.

It is another object of this invention to provide a reproducing apparatus which is capable of discriminating the recording speed with a very simple arrangement without having recourse to the use of a fixed head for that purpose.

Under this object, a reproducing apparatus arranged as an embodiment of this invention to reproduce information signals from a tape-shaped recording medium on which a plurality of pilot signals of different frequencies for tracking control are recorded along with information signals in a superimposed manner comprises: transporting means for transporting the tape-shaped recording medium selectively at one of at least two different transporting speeds in reproducing the information signals; a pair of head means for reproducing the information signals recorded on the tape-shaped recording medium, the pair of head means including at least one rotating head, respectively; a pair of separation means for separating, from the signals reproduced by the pair of head means, a predetermined frequency component related to the plurality of pilot signals, respectively; comparison means for comparing the levels of signals produced from the pair of separation means; and discriminating means for discriminating whether or not the transporting speed of the transporting means is coincident with a transporting speed employed in recording the information signals, said discrimination being made on the basis of the output of the comparison means.

These and further objects and features of this invention will become apparent from the following detailed description of a preferred embodiment thereof, taken in connection with the accompanying drawings.

BRIEF DESCRIPTION OF THE DRAWINGS

FIG. 1 is a block diagram showing, in outline, the arrangement of a VTR arranged as an embodiment of this invention.

DETAILED DESCRIPTION OF THE PREFERRED EMBODIMENT

Figure 2:
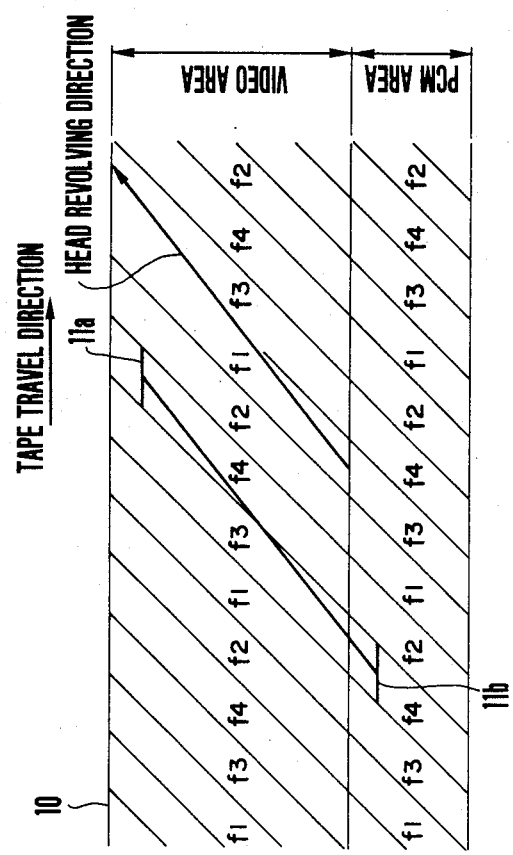
FIG. 2 shows, by way of example, the positional relation between a rotary head and a magnetic tape obtained during recording.

A preferred embodiment of this invention is arranged as described in detail below with reference to the accompanying drawings:

FIG. 1 shows, in outline, a VTR arranged as an embodiment of this invention. The VTR embodying this invention adopts the two-head helical scanning method and is arranged as follows: Pilot signals of four different frequencies are recorded as tracking control signals along with video signals, one in each of recording tracks. In reproducing the video signals, the pilot signals thus recorded are used for tracking control which is performed in a well known manner. The four different frequencies f1, f2, f3 and f4 of the pilot signals are arranged to be f1=6.5 fH, f2=7.5 fH, f3=9.5 fH and f4=10.5 fH, respectively (fH: horizontal synchronizing frequency). These pilot signals are recorded on the magnetic tape 10 in a manner as shown in FIG. 2. Referring to FIG. 2, the video signals are recorded in a video area on the magnetic tape 10. Audio signals are PCM processed and recorded in a PCM area on the same tape. The positional relation between two rotary heads 11a and 11b is as follows: When head 11b is recording the PCM audio signal within the PCM area while the head 11a is recording the video signal within the video area at a point close to the end of the video area, the pilot signals recorded in these two areas during a recording operation are of the same frequency.

Assuming that the tape travel speed is selectable between two different speeds in recording, hereinafter recording or reproduction at the higher tape travel speed will be called the SP mode and recording or reproduction at the lower tape travel speed will be called the LP mode. The tape travel speed in the SP mode is assumed to be two times as fast as the speed in the LP mode. In this specific embodiment, the VTR is provided with four heads including one pair for each of the SP and LP modes. The width of each head is arranged to be 1.5 times as wide as the width of each recording track to be formed in each of the two modes.

Figure 3:
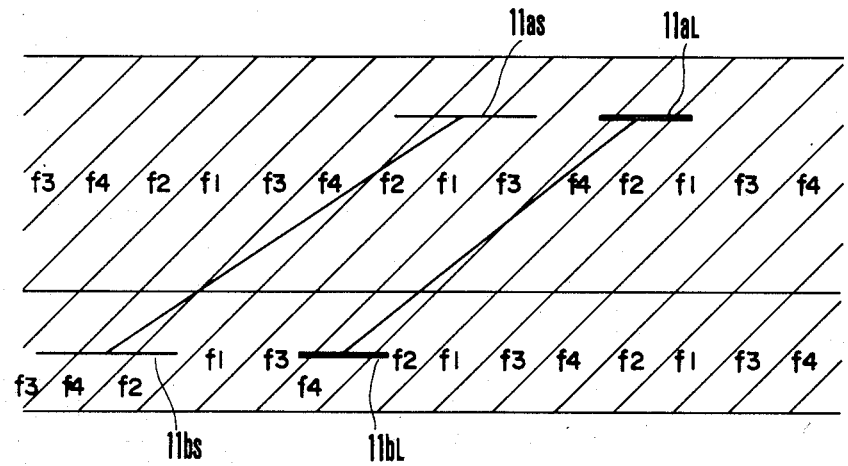
FIG. 3 shows the positional relation between the rotary head and the magnetic tape obtained when reproduction is performed by the VTR of FIG. 1, at a tape travel speed faster than a tape travel speed employed in recording.

In case that a magnetic tape which has been recorded in the LP mode is reproduced in the SP mode, the positional relation of the heads and a recording pattern become as shown in FIG. 3. The following description is on the assumption that, while one of the pair of heads is in the PCM area, the other is in the video area:

Referring to FIG. 3, in this instance, a pair of heads 11aL and 11bL are reproducing in the LP mode signals which have been recorded in the LP mode. As apparent from the illustration, the two pilot signals reproduced by the two heads from the different areas should have the same frequency and should be at the same level in the case of reproduction in the correct reproducing mode.

FIG. 3 also shows another pair of heads 11aS and 11bS as in a state of reproducing in the SP mode, the tape which has been recorded in the LP mode. In that instance, as apparent from the illustration, the two pilot signals reproduced by them differ in frequency and in level from each other. This difference indicates the selection of a wrong reproducing mode.

Figure 4:
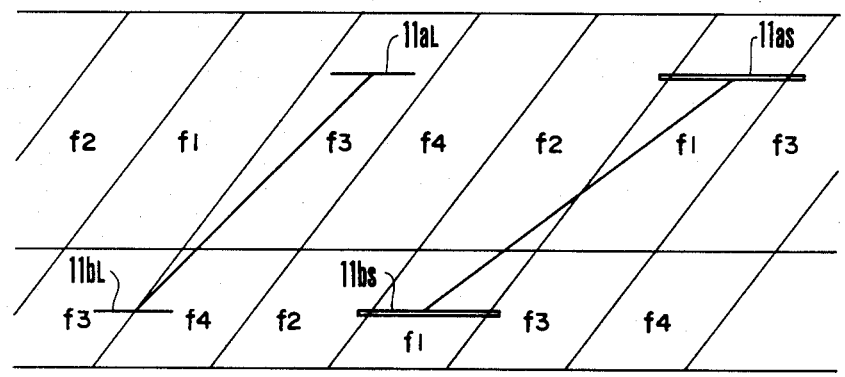
FIG. 4 shows the positional relation between the rotary head and the magnetic tape obtained when reproduction is performed by the VTR of FIG. 1 at a tape travel speed slower than a tape travel speed employed in recording.

FIG. 4 represents a case where a magnetic tape which has been recorded in the SP mode is reproduced in the LP mode. The illustration shows the positional relation between the pair of heads 11aL and 11bL together with a recording pattern formed on the tape. The illustration also shows the other pair of heads 11aS and 11bS as in a state of reproducing, in the SP mode, signals recorded on the tape in the SP mode. As also apparent from FIG. 4, the pilot signals reproduced by the pair of heads 11aL and 11bL come to differ from each other in frequency and in level with the tape reproduced in the wrong mode.

It is thus apparent that reproduction can be appositely carried out with attention fixed on the pilot signal of a specific frequency and with the reproducing mode changed over to the other mode in the event of a level difference between the outputs of the reproducing pair of heads obtained while they are tracing the video and PCM areas of the tape, respectively. Again referring to FIG. 1, the arrangement of this embodiment will be further described in the light of the above.

At a given timing, one head 11aL or 11aS reproduce signals recorded in the video area while the other head 11bL or 11bS reproduce signals recorded in the PCM area.

The reproduced signal produced from the head 11aS, or 11aL is selectively produced from a switch 12a. The reproduced signal from the head 11bS or 11bL is selectively produced from another switch 12b. These switches 12a and 12b operate under the control of a mode setting signal which will be described later. In the LP mode, the reproduced signals from the heads 11aL and 11bL are supplied to amplifiers 13a and 13b respectively. In the SP mode, the reproduced signals from the heads 11aS and 11bS are supplied also to the amplifiers 13a and 13b respectively.

Signals produced from the amplifiers 13a and 13b are switched over from one to the other by changeover switch every time one of the heads traverses the video area. After the switch-over, the output of the changeover switch is supplied to a reproduced video signal processing circuit 16 and also to a tracking signal processing circuit 18. The video signal processing circiut 16 performs a known signal processing operation and produces a video signal. Meanwhile, the tracking signal processing circuit 18 produces a tracking error signal after performing a processing operation in a well known four-frequency method. A reproduced audio signal processing circuit 17 is arranged to demodulate the PCM processed audio signal which is reproduced from the PCM area and to produce an audio signal. The rotary heads 11aS, 11aL, 11bS and 11bL are mounted on a rotary drum 9. A rotation phase detector 19 is arranged to detect the rotation phase of this drum 9. The detector 19 produces a phase detection signal, which is supplied to a timing pulse generator 20. When one of the heads having its output signal selected by the switch 12a or 12b is within the PCM area, a gate circuit 21a or 21b is closed by a gate timing pulse generated by the timing pulse generator 20. Signals passed through these gate circuits 21a and 21b are first supplied to bandpass filters 23a and 23b (hereinafter referred to as BPF's). Then, frequency components corresponding to the pilot signals which are included in the reproduced signal and are of a predetermined frequency are extracted. The extracted pilot signal components are amplified by amplifiers 25a and 25b. The amplified signal components are detected by detectors 27a and 27b, which produce the results of detection as detection output signals Sda and Sdb. The signals Sda and Sdb are supplied to comparators 29 and 31 to have their levels compared with each other. When the difference between the output levels of the two comparators 29 and 31 exceeds a predetermined value, the output of an OR gate 33 becomes a high logic level to indicate that the reproducing mode is wrong. If the output signal of the OR gate 33 remains at a low logic level, it indicates that the reproducing mode coincides with the recording mode. The further details of this operation of making a discrimination between a correct reproducing mode and a wrong reproducing mode are as described below:

As mentioned in the foregoing with reference to FIGS. 2, 3 and 4, if the mode (SP or LP) in which recording signals are recorded on the magnetic tape coincides with the mode in which the signals are reproduced, the pilot signals reproduced from the video area and the PCM area of the magnetic tape coincide with each other. In the case of FIG. 3, for example, the mainly reproduced pilot signals included in both the above-stated signals have the same frequency f4. In this instance, even if both the BPF's 23a and 23b separate the frequency component f4 while both the gates 21a and 21b are ON, both the output signals Sda and Sdb of detectors 27a and 27b are at about even levels. Therefore, the outputs of the two comparators 29 and 31 are always at low levels and the OR gate 33 also always produce a low level signal in this instance. This clearly indicates the coincidence of the reproducing mode with the recording mode to permit the reproducing operation to proceed without changing the reproducing mode.

In the event of disagreement between the recording and reproducing modes, the pilot signals mainly reproduced by the two heads come to differ from each other in frequency and level. For example, assuming that the BPF's 23a and 23b are arranged to separate only the frequency f4, there periodically arises without fail occasions at which the levels of the outputs of these BPF's come to differ. At that time, the output level of one of the two comparators 29 and 31 becomes high. Then, the output level of the OR gate 33 also periodically becomes high to indicate the selection of a wrong reproducing mode. In the case of this embodiment, the output level of a control signal forming circuit 34 changes between a high level and a low level. The high and low levels of the output of this control signal forming circuit 34 correspond to the SP mode and the LP mode respectively. The output controls the switches 12a and 12b as a mode setting signal and thus controls the selection of the reproducing pair of heads. This mode setting signal is supplied also to a capstan control circuit 35. The rotating speed of a capstan 36 is changed as necessary from one speed to another under the control of this signal. A pinch roller 37 is arranged to move the tape 10 in cooperation with the capstan 36.

The travelling speed (or mode) of a magnetic tape employed for recording thus can be discriminated in carrying out reproduction.

In this specific embodiment, the levels of the reproduced pilot signals are arranged to be compared when one of the pair of heads is tracing the PCM area. This timing arrangement, however, may be changed to a point of time when one of the heads is tracing an overlapped part in which a video signal is usually recorded simultaneously with an audio signal in the case of the two-head helical scanning type VTR.

Further, in extracting one of the pilot signals, the operation may be arranged to have the pilot signals of the mainly traced tracks multiplied by means of a multiplier in the four-frequency tracking control process and then to extract a frequency component which is two times as high as the result of multiplication.

What is claimed is:

1. A reproducing apparatus for reproducing information signals from a tape-shaped recording medium on which a plurality of pilot signals of different frequencies for tracking control and information signals are recorded in superimposing relation, comprising:
   (a) transporting means for transporting said tape-shaped recording medium selectively at one of at least two different running speeds for the purpose of reproducing said information signals;
   (b) a pair of head means for reproducing said information signals recorded on said tape-shaped recording medium, said pair of head means including at least one rotating head, respectively;
   (c) a pair of separation means for respectively separating, from a signal by each of said pair of head means, a predetermined frequency component related to said plurality of pilot signals;
   (d) comparison means for comparing the levels of signals produced from said pair of separation means; and
   (e) discriminating means for discriminating whether or not transporting speed of said transporting means is coincident with a transporting speed employed in recording said information signals, said discrimination being made on the basis of an output of said comparison means.

2. An apparatus according to claim 1, wherein said pair of separation means are respectively arranged to separate one of the frequency components of said plurality of pilot signals.

3. An apparatus according to claim 1, wherein said discriminating means determines the transporting speed of said transporting means to be not coinciding with the transporting speed employed in recording said information signals in the event that a level difference obtained as a result of level comparison by said comparison means exceeds a predetermined level.

4. An apparatus according to claim 1, further comprising a pair of gate means respectively arranged to gate the signal reproduced by each of said pair of head means and to supply said signal to each of said pair of separation means.

5. An apparatus according to claim 4, wherein said pair of gate means are respectively arranged to gate the signal reproduced by each of said pair of head means when both of said pair of head means are capable of reproducing signals from said recording medium.

6. An apparatus according to claim 1, further comprising control means for changing the transporting speed of said transporting means from one speed over to another in response to an output of said discriminating means.

7. An apparatus according to claim 6, wherein said head means respectively include a plurality of rotary heads of different head widths, and switching means for selectively producing the reproduction outputs of said rotary heads.

8. An apparatus according to claim 7, wherein said control means is arranged to cause said switching means to perform a switching operation in response to the output of said discriminating means.

9. An apparatus according to claim 1, further comprising means for forming a tracking control signal for tracking control over said pair of head means by using said plurality of pilot signals reproduced by said pair of head means.

10. A reproducing apparatus for reproducing information signals from a tape-shaped recording medium; comprising:
 (a) transporting means for transporting said tape-shaped recording medium selectively at one of at least two different running speeds for the purpose of reproducing said information signals;
 (b) reproducing means for reproducing said information signals recorded on said tape-shaped recording medium, said reproducing means including a pair of rotating heads;
 (c) discriminating means for making a discrimination between coincidence and non-coincidence of the transporting speed of said transporting means with a transporting speed employed in recording said information signals, said discrimination being made by using both the signals simultaneously reproduced by said pair of rotary heads; and
 (d) means for forming a tracking control signal for tracking control over said pair of rotary heads by selectively using signals reproduced by said heads.

11. A reproducing apparatus for reproducing information signals from a recording medium; comprising:
 (a) moving means for moving said recording medium selectively at one of at least two different moving speeds for the purpose of reproducing said information signals;
 (b) a pair of head means for reproducing said information signals recorded on said recording medium; and
 (c) discriminating means for making a discrimination between coincidence and non-coincidence of the moving speed of said moving means with a moving speed employed in recording said information signals, said discrimination being made by using both the signals simultaneously reproduced by said pair of head means.

12. An apparatus according to claim 11, wherein said discriminating means includes a pair of separation means for separating a predetermined frequency component included in each of the signals reproduced by said pair of head means.

13. A reproducing apparatus for reproducing a first information signal from a first area of a tape-shaped recording medium and reproducing a second information signal from a second area of the medium, said first and second areas respectively extending in the longitudinal direction of the tape-shaped recording medium and respectively having many tracks arranged in parallel with each other, the apparatus comprising:
 (a) transporting means for transporting said tape-shaped recording medium selectively at one of at least two different transporting speeds for the purpose of reproducing said first and second information signals;
 (b) head means for reproducing said first and second information signals recorded on said tape-shaped recording medium, said head means including at least one rotary head; and
 (c) discriminating means for making a discrimination between coincidence and non-coincidence of the transporting speed of said transporting means with a transporting speed employed in recording said first and second information signals, said discrimination being made by using both a signal reproduced from said first area by said head means and a signal reproduced from said second area also by said head means.

14. An apparatus according to claim 13, wherein said first information signal includes a video signal and said second information signal an audio signal.

15. An apparatus according to claim 13, wherein said discriminating means includes a circuit for forming a first signal from a signal reproduced from said first area by said head means; a circuit for forming a second signal from a signal reproduced from said second area by said head means; and a circuit for comparing the levels of said first and second signals.

16. An apparatus according to claim 15, wherein each of said first and second signal forming circuits includes a circuit which is arranged to separate only a predetermined frequency component.

17. A reproducing apparatus for reproducing information signals from a tape-shaped recording medium on which many tracks are formed in parallel with each other, each of the tracks having a first portion and a second portion on which different pilot signals are recorded, the apparatus comprising:
 (a) transporting means for transporting said tape-shaped recording medium selectively at one of at least two different transporting speeds for the purpose of reproducing said first and second information signals;
 (b) head means for reproducing said information signals recorded on said tape-shaped recording medium, head means including at least one rotary head; and
 (c) discriminating means for making a discrimination between coincidence and non-coincidence of the transporting speed of said transporting means with a transporting speed employed in recording said first and second information signals, said discrimination being made by using both a signal reproduced from said first portions of the tracks by said head means and a signal reproduced from said second portions of the tracks also by said head means.

18. An apparatus according to claim 17, wherein said first portions and said second portions are respectively aligned in the longitudinal direction of the medium.

19. An apparatus according to claim 17, wherein a video signal is recorded on each of the first portions and an audio signal is recorded on each of the second portions.

20. An apparatus according to claim 17, wherein said discriminating means includes first separation means for separating a predetermined frequency component from a signal reproduced from said first portions by said head means, and second separation means for separating the predetermined frequency component from a signal reproduced from said second portions by said head means.

21. An apparatus according to claim 20, wherein said discriminating means includes comparison means for comparing levels of signals produced from said first and second separation means.

* * * * *